United States Patent [19]

Scudellaro

[11] Patent Number: 4,886,002

[45] Date of Patent: Dec. 12, 1989

[54] TRANSPLANTING MACHINE

[76] Inventor: Loris Scudellaro, via Valli 36, 35020 Candiana (Prov. of Padova), Italy

[21] Appl. No.: 112,856

[22] Filed: Oct. 26, 1987

[30] Foreign Application Priority Data

Nov. 6, 1986 [IT] Italy .................................. 41622 A/86

[51] Int. Cl.⁴ ........................ A01C 11/02; A01B 49/04
[52] U.S. Cl. ...................................... 111/102; 111/115
[58] Field of Search .......................................... 111/1-3, 111/91, 90, 102, 115, 100; 47/9

[56] References Cited

U.S. PATENT DOCUMENTS

| | | | |
|---|---|---|---|
| 1,802,273 | 4/1931 | Richards et al. | 111/3 |
| 2,625,122 | 1/1953 | Carelock | 111/3 |
| 3,103,186 | 9/1963 | Saifuku | 111/2 |
| 3,176,635 | 4/1965 | Mabon | 47/9 |
| 3,204,589 | 9/1965 | Blackhurst et al. | 47/9 |
| 3,705,559 | 12/1972 | Okorokov et al. | 111/3 |
| 4,092,936 | 6/1978 | Griffin et al. | 47/9 |
| 4,117,787 | 10/1978 | Pavan | 111/2 |
| 4,373,833 | 2/1983 | Watanabe | 111/3 |
| 4,455,950 | 6/1984 | Pretzer | 111/3 |

FOREIGN PATENT DOCUMENTS

| | | | |
|---|---|---|---|
| 2423962 | 12/1979 | France | 47/9 |
| 2458212 | 2/1981 | France | 47/9 |
| 2518365 | 6/1983 | France | 47/9 |
| 949872 | 3/1985 | U.S.S.R. | 111/3 |

Primary Examiner—Danton D. DeMille
Attorney, Agent, or Firm—Guido Modiano; Albert Josif

[57] ABSTRACT

The machine is adapted to transplant plants in bare soils or covered by a plastic film, in which case the plastic film is applied by the machine itself which is provided with at least one multiple-arm device pivoted along a horizontal axis and having, at each arm, an openable cup articulated thereto. The plant to be transplanted is placed within the cup connected to the multiple-arm device, which is driven synchronously with respect to the motion of the machine. The cup is sunk into the ground, opening the film if present and the soil, while upon control of a cam said cup opens and transplants the plant. The machine furthermore comprises elements for ridging the soil around the plant, after it same has been transplanted, for preparing the soil in front of the transplanting region and for fixing the edges of a possible plastic film.

11 Claims, 4 Drawing Sheets

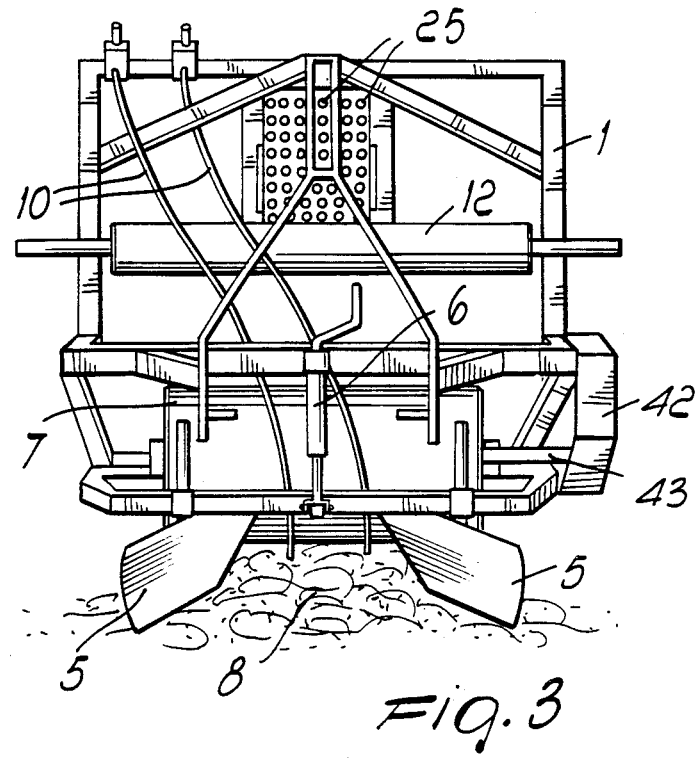
Fig. 3
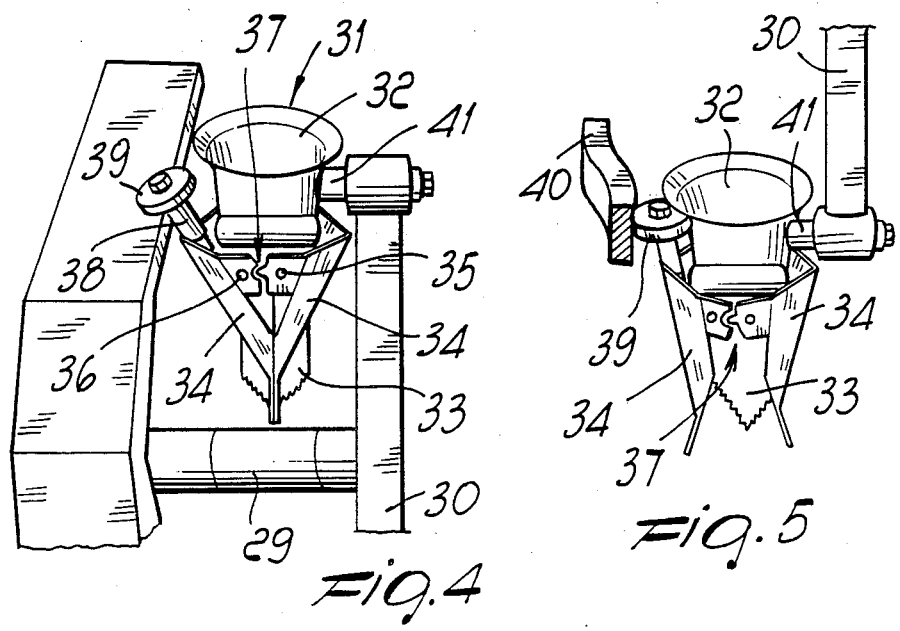
Fig. 4
Fig. 5

TRANSPLANTING MACHINE

BACKGROUND OF THE INVENTION

The present invention relates to a transplanting machine for small plants.

More in particular, the present invention relates to a machine adapted to transplant vegetable, fruit and flower plants, having small dimensions, and to arrange them with constant spacing in parallel rows.

It is known that the crops of vegetables or fruit in which the plant is of the seasonal type, such as melons, tomatoes, aubergines, and peppers, are planted in prepared soil, which is either bare or covered by a plastic film arranging them at preset distances.

On bare soil, this operation, if performed manually without the aid of equipment, requires a long time and the use of a large number of workers, while if known transplanting machines are used it is in any case troublesome since the known machines carry operators who must make a hole in the soil, insert the plant and ridge the soil around it.

If the soil is prepared with a plastic film, to cover mulch for example, machines are known having a perforating element which cuts discs in the progressively applied film uncovering the underlying soil so that the operator can make a hole in that spot and insert the plant therein.

In this case, too, the operation is not easy for the operator, while the cutting of the disc from the film is also sometimes critical since the cut discs, if not removed, may remain and totally or partially obstruct the holes provided, and it also occurs that the discs, cut either mechanically or thermally, jam the cutting element, causing considerable problems and virtually blocking the machine until it is cleaned.

In the second case, that is to say, when the soil is prepared with a plastic film, there is also the considerable problem of the film cutting elements wear.

SUMMARY OF THE INVENTION

The aim of the present invention is to provide an automatic machine suitable both for transplanting plants on bare soils and for the transplant of plants on soil covered with a plastic film.

An object of the invention is to provide a machine which simplifies and facilitates the operations of transplanting of the plants both on bare soil and on soil prepared with a film, covering mulch for example.

Still another object is to provide a machine wherein the operators are seated in a comfortable position, thus allowing them to work with a high yield due to a higher speed of advancement of the machine on the ground.

A further object is to provide a transplanting machine which is also capable of applying the film and of performing thereon holes for the automatic insertion of the plants in the soil.

Not least object is to provide a machine which is sturdy and simple in its mechanical structure and capable of high production yields.

This aim, as well as these and other objects which will become apparent hereinafter, are achieved by a transplanting machine comprising a framework associable to a tractor and provided with support wheels and with seats for operators, characterized in that it comprises a first section for the preparation of the soil, a second transplanting section and a third ridging section, said first section being provided with front ploughshares for the accumulation of the soil and with a presser roller, said second section being provided with at least one motorized multiple-arm device pivoted on a horizontal pivot, to each of its arms there being pivoted an openable cup, said cup being adapted to contain the plant to be transplanted and interacting with the soil, said cup being furthermore operated by a cam control at least when interacting with said soil, said third section being provided with ridging means.

BRIEF DESCRIPTION OF THE DRAWINGS

Further characteristics and advantages of the invention will become apparent from the detailed description of a preferred, but not exclusive, embodiment, given by way of non-limitative example and illustrated in the accompanying drawings, wherein:

FIG. 3 is a front view of the machine;

FIG. 4 is a view of the cup in closed position;

FIG. 5 is a view of the cup in open position;

DESCRIPTION OF THE PREFERRED EMBODIMENTS

Figure 1:
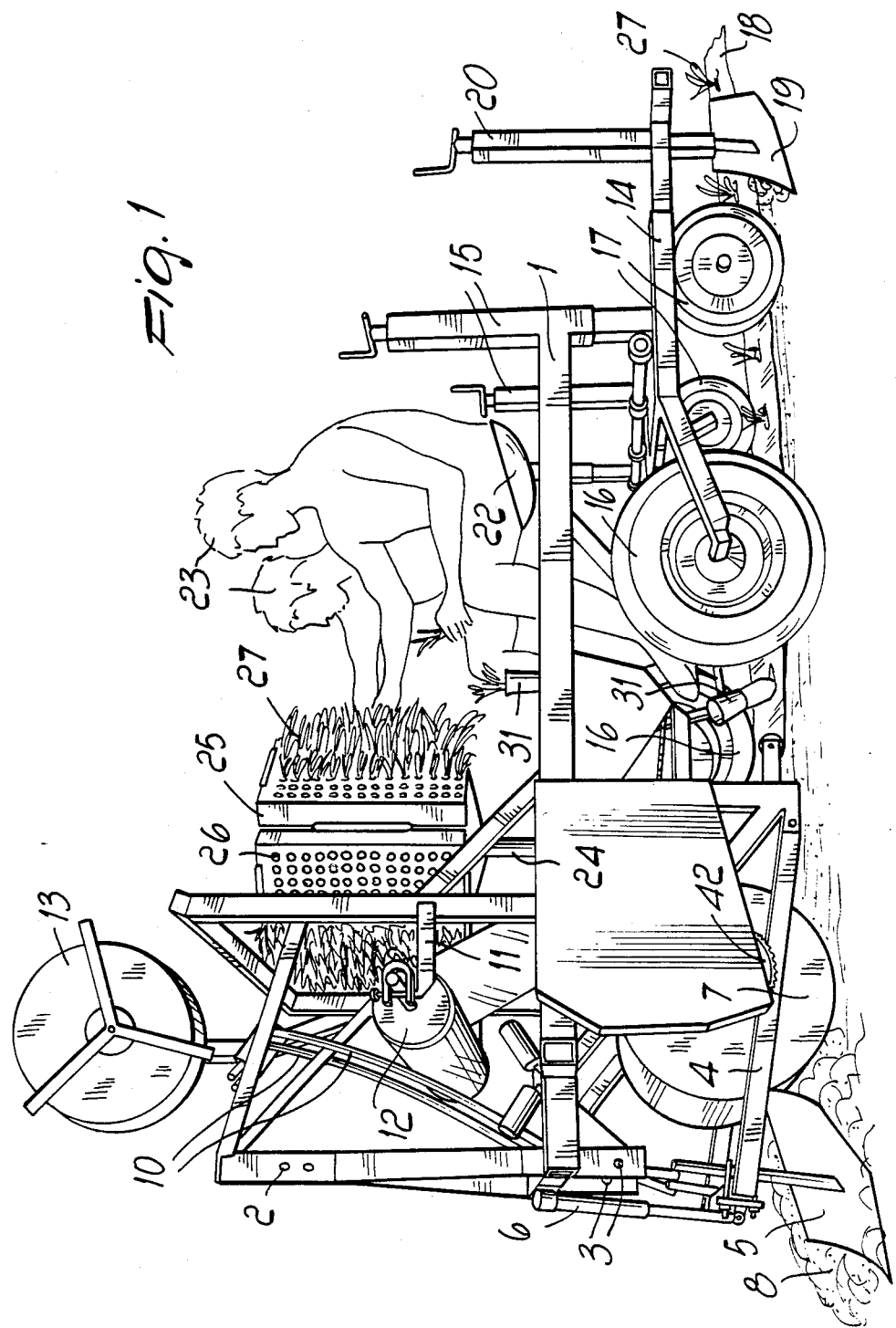
FIG. 1 is an overall perspective view of the machine according to the invention.
Figure 2:
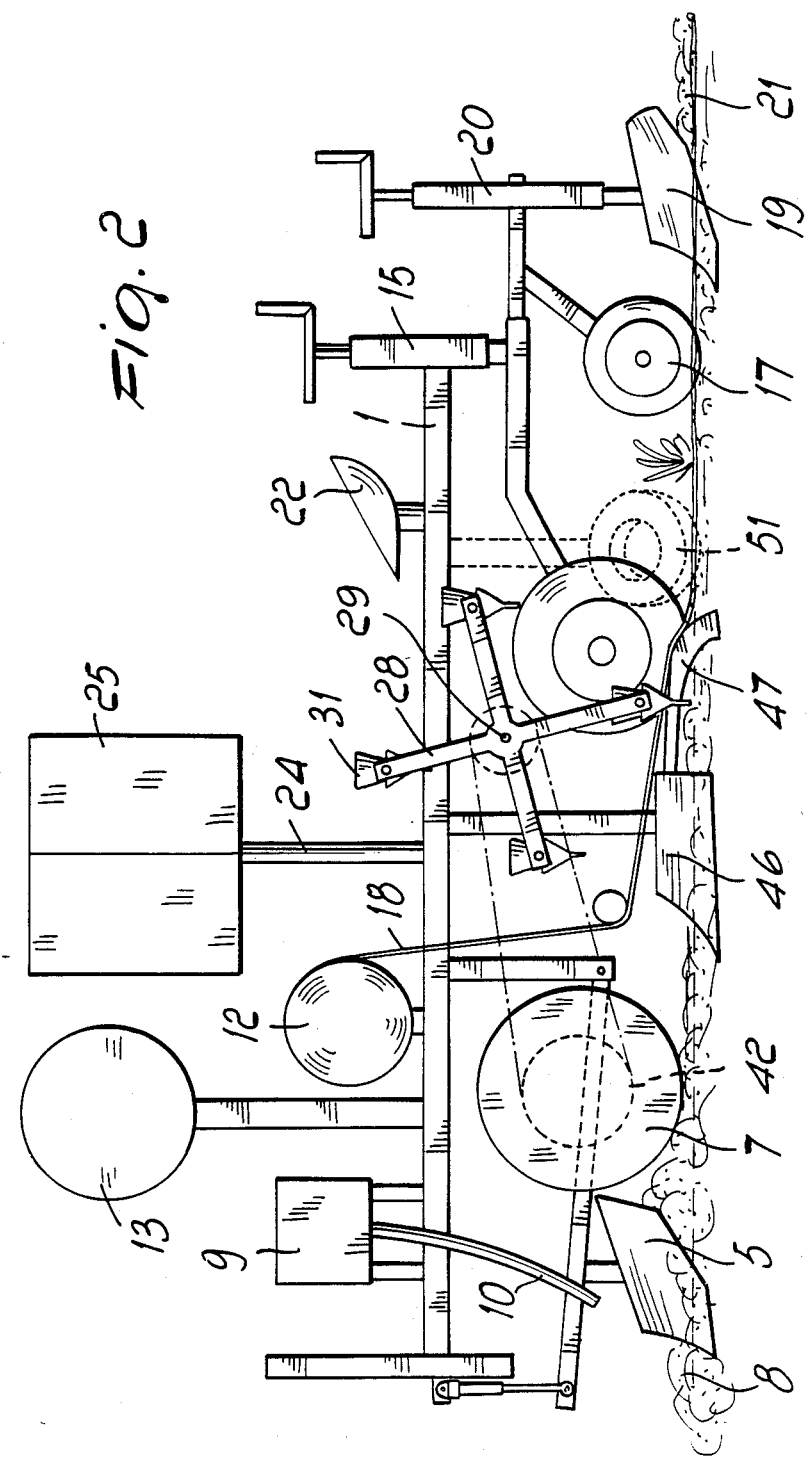
FIG. 2 is a lateral schematic view of the machine.

With reference to the above described figures, the machine according to the invention is composed of a framework 1 frontally provided with an upper coupling point 2 and with two lower coupling points 3 adapted to associate with a three-point coupling of a tractor.

The framework 1 is frontally provided with a C-shaped supporting element 4 articulated to said framework, which supports two front ploughshares 5 the height whereof is adjustable by means of an adjustment device 6 composed either of a hydraulic piston or of a screw control.

Immediately downstream with respect to said front ploughshares 5, a presser roller 7 is provided adapted to flatten the rough soil 8 progressively accumulating towards the center by the front ploughshares 5.

A container of fertilizer 9 may be provided on the same framework 1, substantially above the presser roller 7, and by means of distribution pipes 10 spreads the product onto the soil between the two front ploughshares 5.

A support 11 is provided above said roller 7 and supports a roll 12 of plastic film 18 which can be possibly mounted every time the soil is to be prepared with the film, depending on the type of crop to be planted.

If the film 18 is indeed applied, the machine is provided with a reel 13 supporting an irrigation hose which is applied at the same time as the film 18, below the latter. The hose is not illustrated for the sake of semplicity.

The framework is rearwardly provided with an auxiliary framework 14 adjustable in height by means of a screw adjustment device 15 and frontally provided with two supporting wheels 16 and rearwardly supporting two further edge-presser wheels 17 adapted to keep the film 18 pressed onto the ground. The auxiliary framework 14 is furthermore provided with two rear ploughshares 19, each adjustable in height by means of an individual adjuster 20, which are intended to spread some soil on the edge 21 of the film 18 so that it remains on the ground and is not, for example, lifted by the wind.

At least one seat 22 is provided on said framework of the machine, two seats 22 being provided in the illustrated machine where the operators 23 sit.

The number of seats 22 provided depends on the number of multiple-arm devices 28 provided in the machine. The multiple-arm device 28, which is a four-arm device, will be described hereinafter. The seats 22 are preferably mounted on the framework 1 by means, for example, of jaw couplings so that their mutual distance may be adjusted; the jaw couplings are not illustrated being of a well-known type.

A rotatable support 24 is furthermore provided on the framework 1 of the machine and supports a plurality of containers 25 where the plants 27 to be transplanted are placed in a plurality of holes 26.

A four-arm device 28 is provided frontally with respect to the operators 23 and in front of each thereof, and is pivoted at the pivot 29 to the framework 1 of the machine and bears, at the end of each of its arms 30, an openable cup 31 which will be described hereinafter.

The cup 31 is composed of an upper funnel-like portion 32 downwardly associated with a transverse front pointed and sharpened blade 33 which is saw-toothed so as to cut the soil or the film 18, and of a lower part closed between two dihedral walls 34 matching with one another when closed.

The walls 34 are pivoted with different points of rotation 35 and 36 to the lower wall of the funnel 32, engaging one another by means of a pair of male-female elements 37, composed of a lug inserted in a complementary seat, having the function of forcing the simultaneous opening of the two walls 34 when even only one of them is rotated about its pivoting point.

One of the two walls 34 is provided with an upwardly protruding tab 38, at the upper end whereof a roller 39 is provided which is adapted to follow a cam 40 rigidly associated with the framework and shaped so as to determine the opening of the two walls in a desired position of the cup 31.

Each cup 31 is provided, in the region of the funnel 32, with a lateral pivot 41 by means of which it is associated with one of the arms 30 of the device 28.

This association allows the free rotation of the cup 31 with respect to the arm 30 so that said cup is always arranged vertically due to gravity.

The multiple-arm device 28 is motorized by means of a transmission 42 which is driven by a shaft 43 derived directly from the presser roller 7.

In order to guide the correct position of the cup 31, which is free to oscillate, as mentioned above, with respect to its supporting arm 30, a cup-guiding blade 44 is frontally provided, and the cup slides and rests thereon particularly in the moment in which it cuts the soil 45 possibly covered by the film 18.

In both cases, two small furrow-opener ploughshares 46 are provided at the point in which the cup 31 cuts the film 18 and the soil 45, and are, if the soil 45 is prepared with a film 18, immediately followed by two ridger blades 47, both elements being rigidly associated with the framework 1 of the machine.

The structure, used to transplant plants in soils prepared with film, operates as described hereinafter.

The operator takes a plant 27 from the container 25 and inserts it in the cup 31 which at that instant is in its highest position.

This operation is thereby greatly facilitated and comfortable, since the operator need not bend to place the plant on the soil.

The cup with the plant rotates during the advancement of the machine until it entrenches the soil, perforating the film 18, and at this point, due to the interference of the roller 39 on the cam 40, the cup opens and leaves the plant in the soil between the two furrow-opening ploughshares 46.

Figure 6:
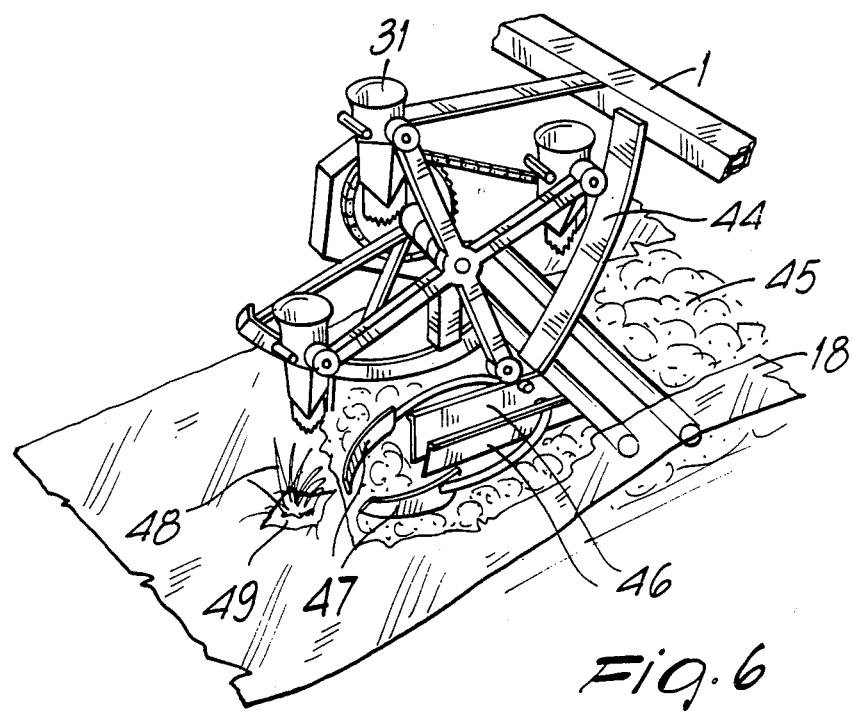
FIG. 6 is a partial perspective view of the multiple-arm device and of the furrowing and ridging devices if the machine is used on soils to be covered by a plastic film.

Immediately after this operation, the cup 31 rises empty while the ridger blades 47 accumulate soil at the side of the plant indicated by 48 in FIG. 6, closing the furrow opened by the small ploughshares 46.

The hole in the film 18 indicated by 49 in FIG. 6 is not obtained by removing material, but exclusively by tearing it.

Figure 7:
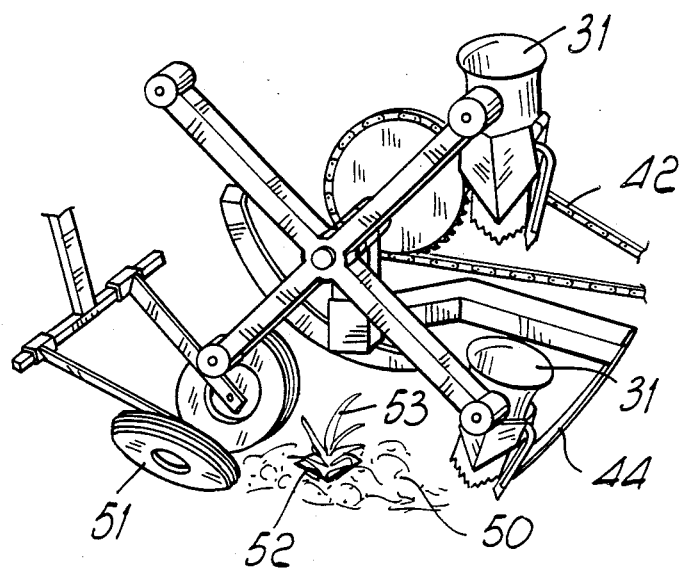
FIG. 7 is a partial perspective view of the multiple-arm devices and of the cups, as well as of the ridging devices if the machine is used on bare soil not prepared with a film.

Operating on bare soil 50, as illustrated in FIG. 7, the device is practically identical in all its components and it further comprises two compacting rollers 51 arranged downstream with respect to the region of operation of the cups 31 for compacting the soil around the hole 52 where the plant 53 has been inserted Naturally all the illustrated devices are mounted on the framework in an adjustable manner so that it is possible to adjust as desired the distance between the rows of plants and the width of the corresponding soil which is accumulated by the front ploughshares 5 and pressed by the roller 7.

Also the transmission 42, which determines the speed of rotation of the multiple-arm device 38, and which consequently determines the frequency of insertion of the plants into the soil and therefore their distance in the row, is adjustable so as to allow to choose the speed of rotation of the device 28 and therefore the distance between one plant and the next of the same row, regardless of the speed of advancement of the machine and therefore regardless of the number of turns of the presser roller 7.

The machine thus conceived can be used for transplants with plastic film or as an ordinary transplanting machine on bare soil simply by choosing one or the other of the illustrated devices.

The machine allows to transplant with precision vegetable plants, fruit plants, tobacco plants etc., either having a bare root or having the said root embedded in conical or cubic earth blocks.

The cup as described allows to plant even plants with a very delicate stem and foliage.

The arrangement of the various parts of the structure allows the operators to work in a comfortable and safe condition.

As previously mentioned, the machine can also be provided with auxiliary elements such as fertilizer, and pesticide dispensers, and, if it is the case, with means for the application of an irrigation hose below the plastic film.

The motorization is derived entirely from the presser roller which conveniently has a large diameter in order to better adjust the soil which is conveyed thereto by the front ploughshares.

By means of a large roller it is possible to work on any type of soil, always obtaining an excellent preparation thereof.

From what has been described and illustrated, it can thus be seen that all the proposed aims have been achieved and that a practically universal transplanting machine has been obtained which allows to solve any problem related to the transplanting of different types of plants with different preparations of the soil.

Naturally, the invention is susceptible to other modifications and variations, all of which are in any case within the scope of the protection of the present patent.

For the same reason, the materials and the dimensions may be any according to the requirements.

I claim:

1. Transplanting machine comprising a framework associable to a tractor and provided with support wheels and with seats for operators, further comprising a first section for the preparation of the soil, a second transplanting section and a third ridging section, said first section being provided with front ploughshares for the accumulation of the soil and with a presser roller, said second section having at least one motorized multiple-arm device pivoted to said framework along a horizontal axis, to each of its arms there being pivoted an openable cup, said cup being adapted to contain the plant to be transplanted and interacting with the soil, said framework including a cam control, said cup being furthermore operated by said cam control, at least when interacting with said soil, said third section being provided with ridging means, said multiple-arm device of said second section being motorized by a variable-ratio transmission driven by said presser roller, wherein said cups are freely mounted oscillating at the end of said arms so that they remain vertical due to gravity.

2. Transplanting machine according to claim 1, wherein said front ploughshares are adjustable both in width and in height and are two in number and are arranged in an advanced postion with respect to said presser roller.

3. Transplanting machine according to claim 1, wherein supports are provided in said first section for a roll of film.

4. Transplanting machine according to claim 1, wherein at least one container is provided in said first section for distributing substnces such as pesticides or fertilizers, said substances being distributed by means of conveyor pipes onto said soil, at the planting line of said plant.

5. Transplanting machine according to claim 1, wherein said cup is composed of an upper funnel-like portion which extends downwardly with a front pointed and sharpened blade arranged transversely with respect to the motion of advancement of said machine on the ground, two mutually complementary lateral walls being furthermore provided individually pivoted on the body of said funnel-like portion so as to be controllably openable, each of said walls being provided with interference elements determining the matching opening and closure of said two walls.

6. Transplanting machine according to claim 5, wherein said interference elements comprise a male element, defined on one of said walls, which inserts itself in a complementarily shaped female element, defined on the other one of said walls, one of said walls being upwardly provided with a roller cooperating with a cam connected with said framework, determining the opeining of said two walls when said cup is sunk into the ground.

7. Transpalnting machine according to claim 1, wherein said cup,in its motion, is kept in correct vertical position upon its approach and partial entrenching of the ground by a cup-guiding blade rigidly connected with said framework whereon said cup is sliding during its approach to the ground.

8. Transplanting machine according to claim 1, wherein said first section includes two front furrow-opening ploughshares and said third section includes two rear ridger blades at the point of insertion of said cup into said soil, operating below a film where provided.

9. Transplanting machine according to claim 1, wherein, for transplanting on bare soil, said machine is provided with two compacting rollers connected with said framework and arranged so as to compact said soil at the side of the transplanted plants.

10. Transplanting machine according to claim 1, wherein those are the same number of seats for the operators as there are multiple-arm devices in said transplanting section, said devices and said seats being adjustably mounted on said framework so as to allow the adjustment of their mutual distance.

11. Transplanting machine according to claim 1, wherein supports are provided in said first section for a roll of film, said machine comprising an auxiliary framework, said auxiliary framework being connected to said third section and being provided with edge presser wheels adapted to press the edges of said film of said roll of film to the ground and with edge-covering ploughshares adapted to cover with earth the edges of said film.

* * * * *